2,957,887
// Patented Oct. 25, 1960

2,957,887

3,3,4,4-TETRACHLOROTETRAHYDROTHIOPHENE-1,1-DIOXIDE AND METHOD OF PREPARATION

Reynold A. Berkey, Painesville, and Henry Bluestone, University Heights, Ohio, assignors to Diamond Alkali Company, Cleveland, Ohio, a corporation of Delaware No Drawing. Filed Mar. 13, 1957, Ser. No. 645,676

2 Claims. (Cl. 260—332.1)

This invention relates to tetrahalotetrahydrothiophene-1,1-dioxides and to the preparation and use of such compounds.

More particularly the present invention relates to 3,3,4,4-tetrahalotetrahydrothiophene-1,1-dioxide having the following structure:

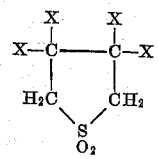

wherein X is a halogen, such as fluorine, chlorine, bromine or iodine, chlorine being preferred.

The preferred compound of the present invention is 3,3,4,4-tetrachlorotetrahydrothiophene-1,1-dioxide having the following structure:

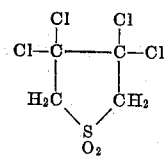

Compounds of the above structure generally exhibit a marked degree of biological activity and are useful in a variety of applications such as fungicides, bactericides, miticides, herbicides, soil fungicides, seed protectants, and the like as will be described in more detail hereinafter. Such compounds, especially 3,3,4,4-tetrachlorotetrahydrothiophene-1,1-dioxide, can conveniently be prepared by halogenating a di- or trihalogenated tetrahydrothiophene-1,1-dioxide, e.g., 3,4-dihalotetrahydrothiophene-1,1-dioxide or 3,3,4-trihalotetrahydrothiophene - 1,1-dioxide, especially 3,4-dichlorotetrahydrothiophene-1,1-dioxide or 3,3,4-trichlorotetrahydrothiophene-1,1-dioxide, as will be described in some detail hereinafter.

Compounds of this invention may be employed in a variety of formulations, e.g., liquids and solids, including finely-divided powders and granular materials, as well as various solutions, concentrates, emulsifiable concentrates, slurries and the like, depending upon the application intended and the formulation medium desired.

Thus it will be appreciated that compounds of this invention may be utilized in diverse biologically active compositions which contain as an essential active ingredient a biologically active, but often minor, amount of at least one novel compound of this invention, which composition may also contain various diluents, extenders, fillers, conditioners, solvents, and the like, e.g., clays, diatomaceous earth, pyrophyllite, talc, spent catalyst, alumina-silica materials, as well as such liquids as water and various organic liquids such as kerosene, benzene, acetone, toluene, xylene and other petroleum distillate fractions or mixtures thereof, such materials being referred to in the specification and claims as carriers.

When liquid formulations are employed, or dry materials prepared which are to be used in liquid form, it frequently is desirable additionally to employ a wetting, dispersing or emulsifying agent to facilitate use of the formulation, e.g., alkyl aryl sulfonates, Triton X-155 (alkyl aryl polyether alcohol), or Atlox G-3335 (alkyl aryl sulfonate blended with polyoxyethylene esters of fatty and resin acids).

In order that those skilled in the art may more completely understand the present invention and the preferred methods by which the same may be carried into effect, the following specific examples are offered:

EXAMPLE I

*Preparation of 3,3,4,4-tetrachlorotetrahydrothiophene-1,1-dioxide*

There are mixed together 148 gms. (0.661 mol) of 3,3,4 - trichlorotetrahydrothiophene - 1,1 - dioxide and 1000 ml. of carbon tetrachloride. This mixture is heated to reflux and 250 ml. of chloroform is added to effect complete solution.

Refluxing is continued while the solution is irradiated with a 100 watt mercury vapor ultra violet lamp disposed in a quartz well immersed in the solution while a total of 1873 gms. of chlorine is bubbled through the solution over a period of 16 hours.

The thus-obtained reaction mixture is cooled in an ice bath and filtered to yield 106.7 grams of a solid melting at 176°–178° C. with a softening point of 169° C. The filtrate is stripped of solvent, cooled and 500 ml. of petroleum ether added. The resultant solid is crystallized from hot carbon tetrachloride solution to produce a product melting at 175°–177° C. This is combined with the previous solid product and dissolved in 500 ml. of carbon tetrachloride, filtered while hot, and the resultant solution allowed to cool. The cooled solution is filtered to yield a crystalline solid (101.7 grams) which is dried in an oven at 60° C. for two hours. The resultant product melts at 178.5°–179.5° C.

Chemical analysis indicates preparation of the desired 3,3,4,4 - tetrachlorotetrahydrothiophene - 1,1 - dioxide ($C_4H_4Cl_4O_2S$) and is as follows:

| Element | Percent Actual | Percent Theoretical |
|---|---|---|
| C | 18.70 | 18.62 |
| H | 1.71 | 1.56 |
| Cl | 55.7 | 54.94 |

EXAMPLE II

There are mixed together 400 gms. (2.12 mols) of 3,4 - dichlorotetrahydrothiophene - 1,1 - dioxide and 3 liters of carbon tetrachloride. This mixture is heated to reflux and exposed to a 100 watt mercury vapor ultra violet lamp in a quartz well immersed in the solution. While maintained at reflux, a total of 21.2 moles (1503 gms.) of chlorine is introduced over a period of 11 hours. Dissolved chlorine is then removed by nitrogen purging and the solution cooled and filtered. The filter cake (crude 3,3,4,4-tetrachlorotetrahydrothiophene - 1,1-dioxide) is dried overnight at 60° C., weighs 390.1 gms. and melts at 174°–177° C. Recrystallization of this material from hot carbon tetrachloride solution produced a material identical with that obtained in Example I.

In the following references to test formulations, aqueous mixtures of the indicated concentrations are intended unless otherwise stated; these formulations are prepared by mixing the toxicant in water usually employing an organic solvent, e.g., 5% acetone, and an emulsifier, e.g., 0.01% Triton X-155 (alkyl aryl polyether alcohol).

EXAMPLE III

Spore germination tests on glass slides are conducted via the test tube dilution method adopted from the procedure recommended by the American Phytopathological Society's committee on standardization of fungicidal tests. In this procedure 3,3,4,4-tetrachlorotetrahydrothiophene-1,1-dioxide in aqueous formulations at concentrations of 1000, 100, 10 and 1.0 p.p.m. is tested for its ability to inhibit germination of spores from 7- to 10-day-old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores.

The formulations are given ratings which correspond to the concentration that inhibits germination of half of the spores (ED 50) in the test drops.

Using the above procedure, 3,3,4,4-tetrachlorotetrahydrothiophene-1,1-dioxide exhibits an ED 50 value in the range from 0.01 to 0.1 p.p.m. against both organisms.

EXAMPLE IV

To illustrate activity as a bactericide 3,3,4,4-tetrachlorotetrahydrothiophene-1,1-dioxide is mixed with distilled water, containing 5% acetone and 0.01% Triton X-155, at a concentration of 1000 p.p.m. Five ml. of this test formulation is put in each of 4 test tubes. To each test tube is then added one of the organisms: *Erwenia amylovora*, *Xanthomonas phaseoli*, *Stapylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-inoculated broth incubated for 48 hours at 37° C. when growth is rated as follows: A=no growth, B=slight, C=moderate and D=heavy growth.

Using the above procedure, ratings against *E. amylovora*, *X. phaseoli*, *S. aureus* and *E. coli*, respectively, of B, A, A and A are obtained at a concentration of 1000 p.p.m. while untreated controls exhibit ratings of D in each case.

EXAMPLE V

Non-plant parasitic nematodes (*Panagrellus redivivus*) are exposed to 3,3,4,4-tetrachlorotetrahydrothiophene-1,1-dioxide (1000 p.p.m. aqueous formulation) in small watch glasses (27 mm. dia. x 8 mm. deep), within a 9 cm. Petri dish and results are recorded 24 hours after treatment.

Using the above procedure, a 100 percent contact mortality and a 94% fumigant mortality is observed using 1.6 mg. per dish. An untreated check sample exhibits a 17% mortality. Repeating this procedure, but at a concentration of 500 p.p.m., the percentage contact mortality after 24 hours still is 100%.

EXAMPLE VI

Part A

To illustrate effectiveness of 3,3,4,4-tetrachlorotetrahydrothiophene-1,1-dioxide as a soil fungicide via an expression of its ability to protect the seeds and seedlings from seed decay and damping off fungi (Pythium and Fusarium species), infested soil, in 4″ x 4″ x 3″ boxes, is treated by drenching the soil with an aqueous formulation of 3,3,4,4-tetrachlorotetrahydrothiophene-1,1-dioxide. Treatment is accomplished by pouring a 2000 p.p.m. test formulation (2000 p.p.m. 3,3,4,4-tetrachlorotetrahydrothiophene-1,1-dioxide—5% acetone—0.01% Triton X-155—balance water) on the surface of the soil. The thus-treated soil is allowed to stand for one day after which time it is removed from each box and thoroughly mixed before being replaced in the box.

Three days after this treatment, 25 pea seeds, variety Pefection, are planted to a uniform depth in each box. Untreated checks are included in each test. Percentage stand is recorded 14 days after planting. Using this procedure at concentrations of 64, 8, 4 and 2 lbs. per acre, respectively, percentage stands of 98, 100, 74 and 12 are obtained as against an untreated control mean of 11% and a sterilized soil control mean of 97%, thus indicating a singularly high soil fungicidal activity.

Part B

This procedure is repeated at concentrations of 8, 4 and 2 lbs. per acre with resultant percentage stands of 98, 83 and 15%, respectively, thus indicating a high degree of soil fungicidal effectiveness against seed decay and dampening off fungi using peas as the indicated plant. An untreated control mean exhibits a percentage stand of 4 while a sterilized soil control mean indicates a percentage stand of 95.

EXAMPLE VII

Further tests are conducted using the procedure of the preceding example in single 9″ x 9″ x 2″ pans at dosages of 6 and 3 lbs./acre of 3,3,4,4-tetrachlorotetrahydrothiophene-1,1-dioxide except that the seeds are planted immediately after soil treatment using 50 pea seeds per pan. By this procedure, the 3,3,4,4-tetrachlorotetrahydrothiophene-1,1-dioxide treatments result in a percentage stand after 14 days of 96 and 78, respectively, while the mean of an untreated control has a 5% stand and the sterilized soil control means exhibits a 94% stand against Pythium species.

EXAMPLE VIII

Further to illustrate soil fungicidal effectiveness the procedure of Example VI is repeated against the organism *Rhizoctonia solani* using peas as the indicator plant. In this procedure, sterile soil is infested with week-old cultures of *Rhizoctonia solani* growing on wheat. 3,3,4,4-tetrachlorotetrahydrothiophene-1,1-dioxide is then mixed with the soil and the peas are planted. By this procedure it is observed that at dosages of 32, 16 and 8 lbs./acre, respectively, percentage stands after 14 days of 78, 70 and 40 are obtained as contrasted with an infested control of 12% and a sterilized soil control of 92%.

EXAMPLE IX

To illustrate the effectiveness of 3,3,4,4-tetrachlorotetrahydrothiophene-1,1-dioxide as an anti-fungal seed protectant, the chemical is formulated as a 5% dust using pyrophyllite as a carrier. Pea seeds are then treated with this formulation at three different dosages, i.e., 0.018, 0.006 and 0.002% active ingredient based on seed weight. Eight replications for each dosage are set up in Pythium-infested soil using 25 seeds per replicate. Emergence of pea plants is observed 7 days and 14 days after planting of seeds. The resulting data (average of the eight replications) are indexed comparatively in the following table compared with an untreated soil control and a sterile soil control.

| Treatment | Percent Emergence | | | | | | | |
|---|---|---|---|---|---|---|---|---|
| | After 7 Days | | | | After 14 Days | | | |
| | Active ingredient dosage expressed as percent seed weight [1] | | | | | | | |
| | 0.018 | 0.006 | 0.002 | None | 0.018 | 0.006 | 0.002 | None |
| 3,3,4,4-tetrachlorotetrahydrothiophene-1,1-dioxide | 86 | 82 | 58 | | 91 | 84 | 61 | |
| Untreated soil control | | | | 0.5 | | | | 1.0 |
| Sterile soil control | | | | 65 | | | | 97 |

[1] 0.12 percent by seed weight=1.08 oz./bushel of peas or 0.0625 percent by seed weight=1 oz./100 lbs. of seed.

The above data reflects a high efficiency of 3,3,4,4-tetrachlorotetrahydrothiophene-1,1-dioxide as a pea seed protectant.

The practice of the present invention contemplates preparation of 3,3,4,4-tetrahalotetrahydrothiophene-1,1-dioxide, notably 3,3,4,4-tetrachlorotetrahydrothiophene-1,1-dioxide by halogenation, e.g., chlorination of 3,4-di- or 3,3,4 - tri - halogenated tetrahydrothiophene-1,1-dioxides. More specifically, this method comprises halogenating the appropriate di- or tri-halogenated tetrahydrothiophene-1,1-dioxide, preferably dissolved in an organic solvent such as carbon tetrachloride preferably in the presence of actinic light, especially ultra violet light as provided by a mercury vapor lamp, or fluorescent lamp capable of emitting the desired radiation. That the 3,3,4,4-tetrahalo compounds are obtained is surprising in the light of the prior art teaching; for example, Jordan and Kipnis, JACS 71, 1876 (1949), did not obtain this type of compound in further chlorination of 3,4-dichlorotetrahydrothiophene-1,1-dioxide.

Accordingly, it is to be understood that the present invention also is concerned with the method of preparing 3,3,4,4 - tetrahalotetrahydrothiophene - 1,1 - dioxides and especially 3,3,4,4-tetrachlorotetrahydrothiophene-1,1-dioxide, by chlorinating the appropriate di- or tri-chlorinated tetrahydrothiophene-1,1-dioxide preferably at an elevated temperature generally at a reflux temperature of the reaction mixture which comprises initially the di- or tri-halogenated tetrahydrothiophene-1,1-dioxide and an organic solvent such as chloroform or carbon tetrachloride. The solvent preferably should be one capable of dissolving the reactants and not subject to appreciable halogenation. To the reaction mixture is introduced gaseous chlorine in a molecular excess over the theoretical amount for a period of several hours. The amount of chlorine can vary from the stoichiometric amount necessary to produce the desired compound to about 40 times this amount.

In addition to the specific uses herein set forth, it will be appreciated that application as an anti-fungal agent contemplates utility against both plant and non-plant fungi, e.g., *Tinea microsporon* or *T. megalosporon*. Moreover, the biological activity referred to herein contemplates activity against both plant and non-plant parasites.

It is to be understood that although the invention has been described with specific reference to particular embodiments thereof, it is not to be so limited, since changes and alterations therein may be made which are within the full intended scope of this invention as defined by the appended claims.

What is claimed is:

1. 3,3,4,4-tetrachlorotetrahydrothiophene-1,1-dioxide.

2. In the process of preparing 3,3,4,4-tetrachlorotetrahydrothiophene-1,1-dioxide which comprises chlorinating a substance selected from the group consisting of 3,4-dichlorotetrahydrothiophene-1,1-dioxide and 3,3,4-trichlorotetrahydrothiophene-1,1-dioxide, by passing gaseous chlorine into a solution of a substance selected from said group, the solvent of said solution being also a solvent for chlorine, the improvement which includes exposing said solution to actinic light while passing chlorine thereinto, and maintaining said solution at the reflux temperature.

References Cited in the file of this patent

Jordan et al.: Journal of the American Chemical Society, vol. 71, pp. 1875–1876 (1949).

Backer et al.: Recueil des Travaux Chimiques des Pays-Bas, vol. 62, pp. 815–823 (1943).

Zuydewijn: Recueil des Travaux Chimiques des Pays-Bas, vol. 57, pp. 445–455 (1938).

Staudinger et al.: Berichte des Deutsche Chemie, vol. 68B, pp. 455–471.

Schmidt: Organic Chemistry, 7th Edition (1955), p. 133 (Oliver and Boyd, London).